May 20, 1941.  A. STILLMAN  2,242,631
PROCESS OF MANUFACTURING RELIEFS
Filed March 30, 1940  2 Sheets-Sheet 1
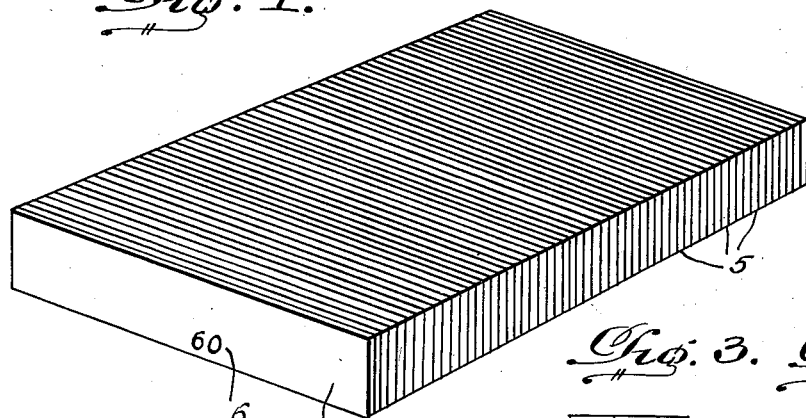
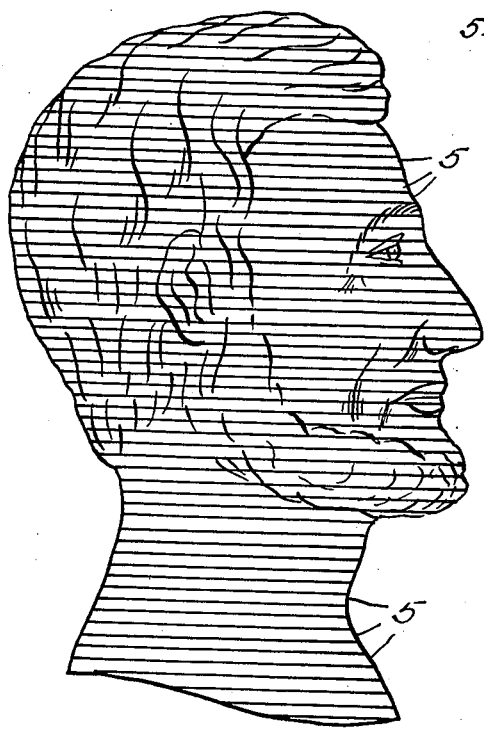
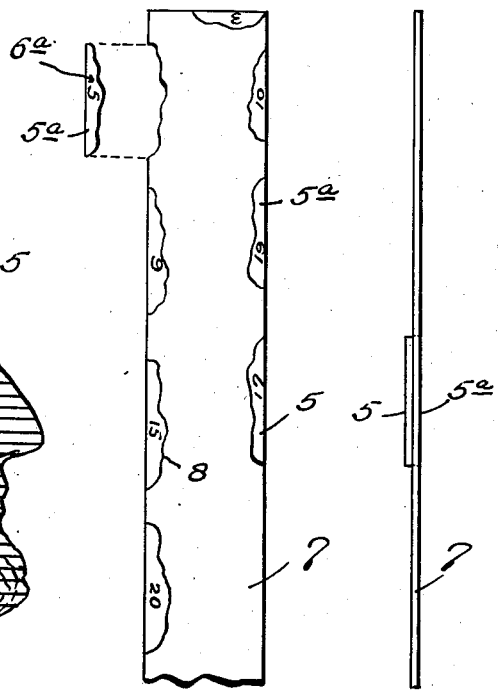
Inventor
Abe Stillman,
By J. Stanley Burch
Attorney May 20, 1941.    A. STILLMAN    2,242,631
PROCESS OF MANUFACTURING RELIEFS
Filed March 30, 1940    2 Sheets-Sheet 2

Inventor
Abe Stillman
By Stanley Burch
Attorney

Patented May 20, 1941

2,242,631

UNITED STATES PATENT OFFICE 2,242,631

PROCESS OF MANUFACTURING RELIEFS

Abe Stillman, Chicago, Ill.

Application March 30, 1940, Serial No. 326,981

2 Claims. (Cl. 41—25)

This invention relates to a new and useful process of manufacturing reliefs, and the primary object of the invention is to provide for efficient reproduction of an object in an easy and economical manner, whereby quantity production at low cost may be facilitated.

In the accompanying drawings:

Figure 1 is a perspective view of a slab or panel produced in accordance with the initial step of the present process.

Figure 2 is an elevational view of the master model produced by carving the panel or slab of Figure 1.

Figure 3 is a fragmentary developed plan view illustrating the manner of using the sections of the model of Figure 2 for reproducing said sections so that their reproductions may be assembled in producing any desired number of completed reliefs.

Figure 4 is an edge elevation looking toward the left of Figure 3.

In accordance with the present invention, a plurality of slats 5 are placed on edge and in side by side contiguous relation so as to form a panel or slab as shown in Figure 1, which slab is relatively thick as defined by the width of the slats 5. Also, this panel or slab is of a length equal to the greatest length of the object to be reproduced and is of a width equal to the greatest width of said object. Before forming the slab or panel, the slats 5 are consecutively numbered or otherwise marked to distinguish them from each other, as at 6. These assembled slats are held together by clamps or other means, whereupon the surface of the slab or panel formed by the assembled slats is carved to reproduce the contour of the original object. The slab or panel is then cut out to reproduce the contour of the original object, the carving being done by hand or upon a wood carving machine. When these steps are accomplished, a master model is produced as illustrated in Figure 2.

Figure 5:
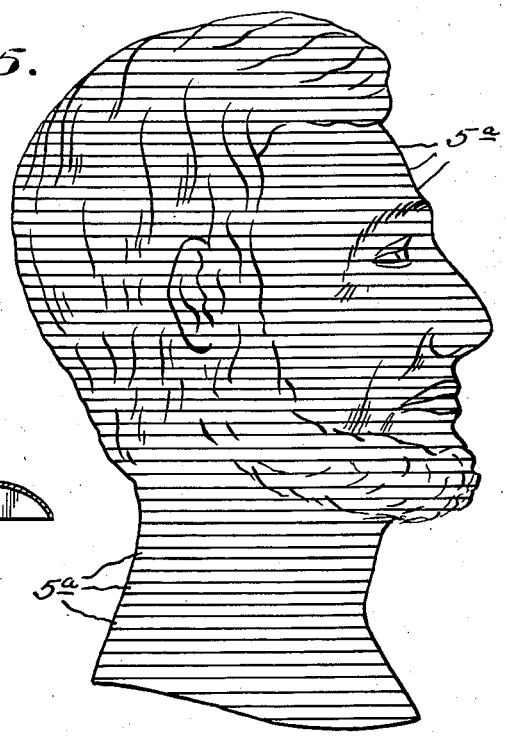
Figure 5 is a view similar to Figure 2 showing a partially completed relief formed by assembling reproductions of the sections of the master model shown in Figure 2.
Figure 7:
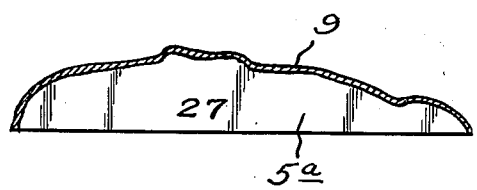
Figure 7 is a transverse section on line 7—7 of Figure 6.
Figure 6:
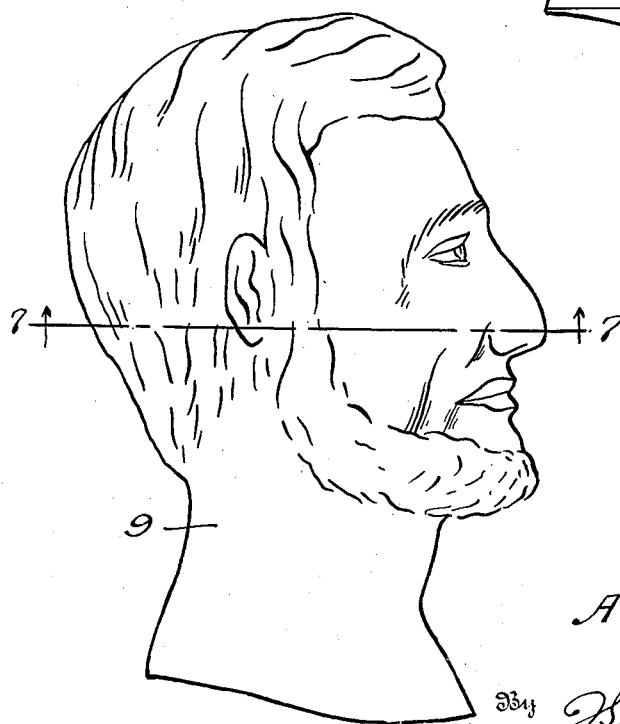
Figure 6 is an elevational view of the completed relief produced by suitably finishing the partially completed relief of Figure 5.

After completing the master model of Figure 2, the strip-like sections thereof represented by the remaining portions of the original slats 5, are separated and reproduced in any desired number by placing them flatly upon a board or sheet 7, tracing or otherwise reproducing them on this sheet or board 7 as at 8, and then cutting the reproductions from the board or sheet 7 to provide the reproductions of the sections of the master model as indicated at 5a. These reproductions 5a are correspondingly numbered or marked so that they are identified with the sections of the master model which they reproduce. The reproductions 5a of the sections of the master model are then properly assembled in consecutive order so as to provide the partially completed relief of Figure 5. Obviously, any number of these partially completed reliefs may be readily made by reproducing each section 5 of the master model the desired number of times in the manner described. The master model will thus be produced exactly upon assembling the reproduced sections 5a. The latter sections are glued or held together in any suitable way so that the lower edges thereof are flush with each other, thereby providing the partially completed relief with a flat bottom surface. When this is done, the upper surface of the partially completed relief naturally forms the contours of the original object and the master model, as well as the outline thereof. This partially completed relief of Figure 1 is then finished by sand papering the upper surface thereof to remove any traces of roughness, and then painting or filling in the upper surfaces of a sealer. After this initial coat of paint or sealer dries, a final painting in any desired color or colors may be resorted to for giving the desired color effect of the completed relief shown in Figure 6. The paint or sealer applied to the surface of the relief in finishing it is indicated at 9 in Figure 7, and the consecutive numbers or identification marks provided on the reproductions 5a of the sections 5 of the master model are indicated at 6a.

From the foregoing description, it will be seen that I have provided a very simple and economical process of reproducing objects for the quantity production of reliefs accurately reproducing the original object. It will also be noted that the thickness of the slats 5 may be varied according to requirements, thinner slats being used where the object is more detailed, and relatively thicker slats being used where the object is plainer or less detailed. It is essential that the slats be of uniform width and they are preferably of similar length.

What I claim as new is:

1. The process of manufacturing reliefs, which consists in placing a plurality of elongated rectangular slats of similar width in side by side contiguous relation to provide a relatively thick panel of a length equal to the greatest length of the object to be reproduced and of a width equal to the greatest width of the object to be reproduced, carving this panel by removing upper edge portions of said slats so as to reproduce the surface contours of the object on the upper surface of said panel and so as to reproduce the outline of the object, thereby providing a master model constituting a reproduction of the original object and composed of separable sections constituting the portions of the slats of the original panel which remain after carving, reproducing the sections of the master model by tracing them on and cutting the tracings from a sheet, assembling the reproductions of said sections to form a partially completed relief simulating the master model, and suitably finishing the surface of said partially completed relief.

2. The process of manufacturing reliefs, which consists in placing a plurality of elongated rectangular slats of similar width in side by side contiguous relation to form a relatively thick panel having a length and width equal to the greatest length and width respectively of the object to be reproduced, providing distinguishing marks on said slats, carving said panel by removing upper edge portions of said slats so as to reproduce the surface contours of the original object on one surface thereof and so as to reproduce the outline of the original object, to thereby provide a master model composed of sections constituting the portions of the original slats which remain after carving, reproducing the sections of said master model by tracing them on and cutting the tracings from a sheet or board, providing distinguishing marks on the reproductions of said sections corresponding to those on the sections of the master model, assembling and securing together the reproductions to provide a partially completed relief accurately reproducing the master model, and finishing the surface of the partially completed relief.

ABE STILLMAN.